Oct. 1, 1929.  C. T. PFLUEGER  1,730,332
FISHING REEL
Filed June 19, 1924
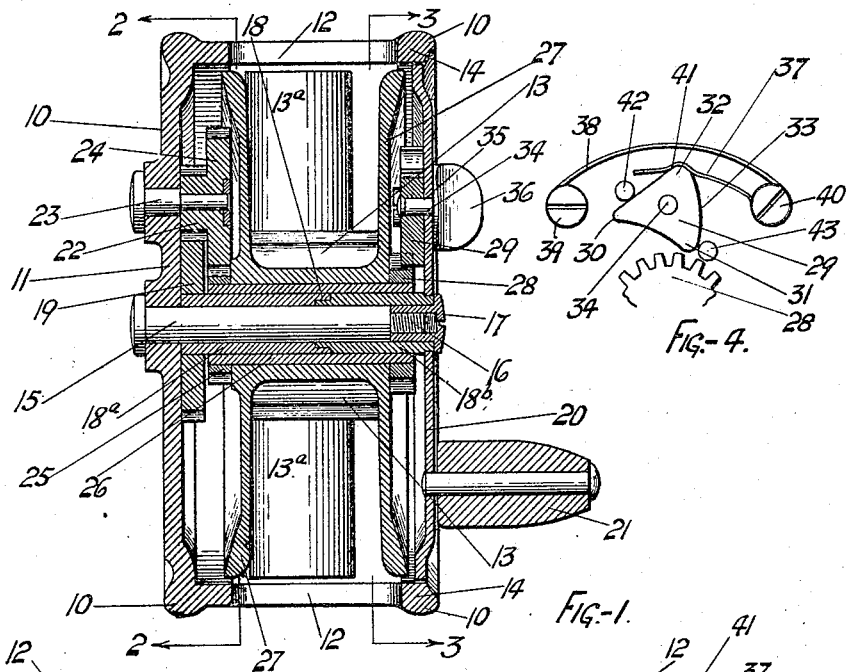
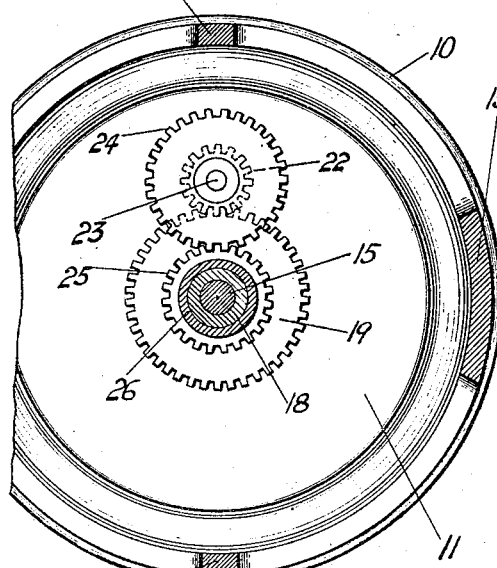
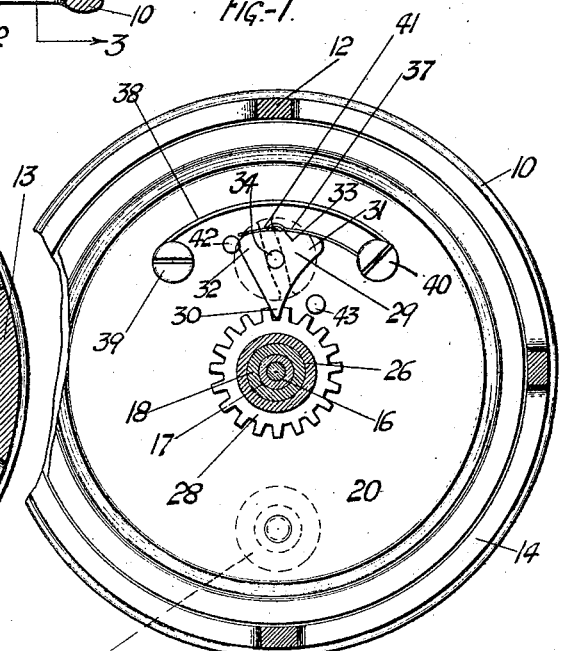
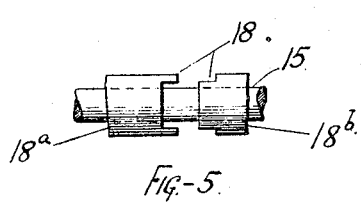
INVENTOR.
CHARLES T. PFLUEGER.
BY
ATTORNEY.

Patented Oct. 1, 1929

1,730,332

UNITED STATES PATENT OFFICE

CHARLES T. PFLUEGER, OF AKRON, OHIO, ASSIGNOR TO THE ENTERPRISE MANUFACTURING COMPANY, OF AKRON, OHIO, A CORPORATION OF OHIO

FISHING REEL

Application filed June 19, 1924. Serial No. 720,899.

This invention relates, in general, to fishing reels and in particular to a narrow, diecast fishing reel of a multiplying type.

The purpose of the invention is to provide a simple, inexpensive, but highly efficient reel mechanism and the invention has for one of its important objects, whereby the above advantages are obtained, to provide a reel cage as an integral casting, including a backplate, cross-piece, a cross-plate and a front ring for encircling a rotatable front driving disc.

Another object of the invention is the provision of a reel of a multiplying type in which the gearing is located on the back plate.

Another object of the invention is to provide a split shaft between the driving disc and the gears to facilitate assembly of the reel.

Another object of the invention is to provide a click mechanism on a rotatable front disc.

Another object of the invention is to provide a click mechanism which is weak in one direction and strong in the other direction.

Another object of the invention is to provide a button on the front disc for adjusting the click mechanism from operative to inoperative positions, or vice versa, the button being adapted to rotate the click pawl, means being provided on the driving disc to limit the rotation thereof.

Another object of the invention is to so dispose the driving disc with relation to the front ring that the marginal peripheral surface of the disc and the inner peripheral surface of the ring are substantially in the same plane, the disc and the inner periphery of the ring being of such diameter that sufficient clearance will be provided therebetween to permit rotation of the disc within the ring. It is also a further object in this connection to provide a disc of larger diameter than the flanges of the spool, so that the reel is effectually housed in a compact structure.

The above and other objects will become apparent when the following detailed description is read in connection with the accompanying drawings, it being understood that the invention is not wholly limited in the claims to the specific structure shown and described.

Of the accompanying drawings:

Figure 1 is an enlarged diametrical section through the reel, certain parts being shown in elevation;

Figure 2 is a section on line 2—2 of Figure 1;

Figure 3 is a section on line 3—3 of Figure 1;

Figure 4 is a detail of the click mechanism; and

Figure 5 is a detail of the split shaft.

Referring to the drawings, 10 is an integral casting including a back plate 11, cross pieces 12, 12 and 13, and front ring 14. For securing the reel on a rod, a suitably shaped cross plate 13$^a$ is shown in Figure 1 secured to the part 13. Secured in the center of the back plate 11 is a cylindrical pin 15 formed with a reduced threaded portion 16 on its forward end, the portion 16 being adapted to receive a screw-cap 17. The pin 15 has journaled thereon a hollow split shaft 18 comprising two parts 18$^a$ and 18$^b$, one section of which, 18$^a$, has secured thereon a gear 19 and the other section of which, 18$^b$, has secured thereto a rotary front driving disc 20, the two sections 18$^a$ and 18$^b$ being held together by the screw cap 17 on the pin 15, which screw cap is adapted to telescope, as shown in Figure 1, into the end of the hollow shaft 18. The sections of shaft 18 have, respectively, an interlocking squared projection and recess at the joint, as will be understood from Figure 5, whereby the shaft sections will rotate as a unit when driven by the disc 20 which has a handle 21 secured thereon by which it is adapted to be manually rotated.

The gear 19 is in mesh with a gear 22 journaled on a pin 23 secured eccentrically in the back plate 11, a gear 24 being rotatable with the gear 22 on the pin 23. The gear 24 is in mesh with a gear 25 which is secured on a sleeve 26, the latter being journaled on the shaft 18 and having secured thereon the spool 27 which is formed as a single casting, the sleeve 26 also having secured on its front end a ratchet wheel 28 forming a part of a click mechanism.

The click mechanism includes the ratchet 28 and a substantially triangularly shaped pawl 29, the latter being formed at one corner with a tongue 30, engageable with the teeth of the ratchet 28, and at the other corners with rounded portions 31 and 32. Between the portions 31 and 32 the pawl is formed with an outwardly arced edge 33 for a purpose later to be explained. The pawl 29 is secured on a short shaft 34 journaled in an aperture 35 formed eccentrically in the disc 20 and is adapted to be rotated by a button 36 integrally formed on the shaft.

Arranged for cooperation with the pawl 29 is a leaf spring 37 formed by securing one end of a strip of spring metal 38 to the disc 20 by a binding post 39 and looping the other end about a binding post 40 in the manner shown in Figure 3, the spring 37 being formed as an arc of approximately the same radius as the arc 33 and having a depression 41 in its under surface, as shown in Figure 3. The spring 37 is adapted normally to hold the pawl 29 in the position shown in Figure 3 by engagement with the arced edge 33 of the pawl. It will be apparent that the above construction is such that when the drive disc 20 is rotated clock-wise for reeling in the line, the reel 27 will travel faster than the drive disc 20 depending upon the particular gearing on the back plate and that tongue 30 will be urged to the left, as shown in Figure 3, by the ratchet 28, thus urging the portion 32 of the pawl against the extreme free end of the spring 37. Accordingly, the action of the click on the reel will be weak in this direction. When the disc 20 is rotated counter-clock-wise, as by the fish exerting tension on the line, the reel 27 will travel faster than the disc counter-clock-wise and the tongue 30 will be urged to the right, as shown in Figure 3. This will urge the portion 31 of the pawl against the spring 37 at a point close to the post 40 wherefore the action of the click on the reel will be strong in this direction. This result is increased by the fact that the center of oscillation 34 of the pawl is closer to the point 32 than it is to 31.

In order to limit the movement of the pawl in either direction, as described above, pins 42 and 43 are secured, as shown in Figures 3 and 4 on the disc 20, the pin 42 being so disposed as to permit the rotation of the pawl 29 by button 36 into the position shown in Figure 4, wherein the reel is permitted to run free, the portion 32 of the pawl being adapted to seat in the depression 41 in the spring 37 so that the latter will hold the pawl in inoperative relation to the ratchet 28.

It will be seen from the foregoing that the reel of the invention comprises three separable units lending to its ready assembly or taking apart. They are the cage 10 carrying the section 18ª of the shaft and gears 19, 22 and 24; the spool 27 carrying the gear 25 and the ratchet 28, and adapted to be inserted in the cage 10 over the section 18ª of the shaft; and the driving disc 20 carrying the section 18ᵇ of the shaft and the click mechanism, this unit being adapted to be connected to the others by inserting the shaft section 18ᵇ into the sleeve 26 and rotating the drive disc relative to the spool until the sections of the shaft mate. The three units are held together by the single cap-screw 17.

If no click is desired, the button 36 is operated to rotate the pawl 29 into the position shown in Figure 4. In reeling in the line the drive disc 20 is rotated clock-wise, thus driving gear 19 which in turn drives gear 22, the latter in turn driving gear 24 which finally drives gear 25 and the spool 27; the spool, in this instance, being driven about four times as fast as the drive disc 20. As explained above, the click will be operating comparatively weak during this action. When permitting the spool to reel out the line when the fish strikes or while playing the fish, the spool and disc will rotate in reverse direction, the disc one-fourth as fast as the spool, in this instance, and the click will have a strong action, as has been explained.

Modification of the invention may be resorted to without departing from the spirit or scope thereof as claimed in the appended claims.

What I claim is:

1. A reel of the character described, comprising a driving disk and back plate connected together so as to be relatively rotatable, a shaft connected to the driving disk, a gear driven by said shaft, gears on the back plate driven by said gear, a spool journaled on the shaft, and a gear on said spool adapted to be driven by one of the gears on the back plate.

2. A reel of the character described, comprising a back plate and a rotatable driving disk, a shaft connected to the driving disk and journaled on the back plate, a gear on said shaft, a gear on said back plate driven by said gear, a spool journaled on the shaft, and a gear on the spool meshing with the gear on the back plate.

3. A reel of the character described, comprising a back plate and a rotatable disk, a sectional shaft, one section of which is connected to the driving disk and the other section of which is journaled onto the back plate, said sections being adapted to be connected to be driven as a unit, a gear on the shaft, a gear on the back plate driven by said gear, a spool journaled onto said shaft, and a gear on said spool meshing with the gear on said back plate.

4. A reel of the character described, comprising a cage, a split shaft, one section of which is journaled onto the cage, a driving element connected to the other section of the shaft and rotatable in the cage, a spool on the shaft and rotatable in the cage, and driving connections between the shaft and the spool.

5. A reel of the character described, comprising a cage including a back plate, a split shaft, one section of which is journaled onto the back plate, a driving element including a driving disk secured to the other section of said shaft and rotatable in the cage, a spool journaled onto the shaft, a gear on the first shaft section, a gear on the back plate, and driven by said first gear, and a gear on said spool meshing with the second gear.

6. A reel of the character described, comprising a back plate and a driving disk, a shaft between the plate and the disk, a spool on the shaft, geared driving connections between the shaft and the spool, a ratchet on the spool, and click mechanism carried by the disk adapted to cooperate with said ratchet.

7. A reel of the character described, comprising a back plate and a driving disk, a shaft between the plate and the disk and adapted to be driven by the disk, a gear on said shaft, a gear on the back plate driven by the first gear, a spool journaled onto the shaft, a gear on the spool meshing with the second gear, a ratchet on the spool, and click mechanism on the driving disk engageable with the ratchet.

8. A reel of the character described, comprising a back plate and a driving disk, a shaft, a spool on the shaft, gearing on the back plate adapted to be driven by the shaft and adapted to drive the spool, and click mechanism on the driving disk adapted to retard rotation of the spool.

9. A reel of the character described, comprising a back plate and a driving disk, a shaft between the plate and the disk and adapted to be driven by the disk, a spool on the shaft, gearing on the back plate adapted to be driven by the shaft and adapted to drive the spool, and click mechanism on the driving disk adapted to retard rotation of the spool.

10. A reel of the character described, comprising a back plate and a driving disk, a pin on the back plate, a shaft rotatably mounted on the pin, a spool on the shaft, means for rotating the shaft, gearing on the back plate driven by the shaft and adapted to drive the spool, and click mechanism on the front plate adapted to retard rotation of the spool.

11. A reel comprising three separable units, the first unit including an integral plate, cross-pieces and ring, and a shaft journaled onto the plate, the second unit including a spool journaled onto the shaft, and the third unit including a disk encircled by the ring and adapted to be connected to the shaft.

12. In a reel construction a unit comprising a plate, a pin secured to the plate, a hollow shaft section on the pin, a gear on said shaft section, a spool, a gear on the plate adapted to be driven by said first gear and adapted to drive a gear on the spool, said pin being adapted to rotatably support the spool, and a driving disk having a shaft section carried thereby.

13. In a reel construction a unit comprising a plate carrying a shaft section, said unit being adapted to be connected to a unit carrying a second shaft section, a spool, and gearing driven through the shaft sections for rotating the spool.

14. In a reel construction, a unit comprising a disk carrying a click mechanism adapted to cooperate with a second unit and a shaft section adapted to be connected to another shaft section carried by a third unit.

15. A reel comprising a driving disk and back plate and a split shaft between the disk and plate, said shaft being adapted to receive a spool and gearing driven through the split shaft for rotating the spool.

16. A reel comprising a driving disk and a plate, a split shaft, one section of which is journaled on the plate and the other section of which is secured to the disk, a spool on said shaft and gearing driven through the shaft sections for rotating the spool.

17. A reel comprising a driving disk and a plate, a journal secured to the plate, a hollow shaft section on the journal and a second hollow journal shaft section secured to the driving disk, said journal being adapted to receive the second shaft section, a spool on said shaft sections and gearing driven through the shaft sections for rotating the spool.

18. A reel comprising a driving disk and a plate, a journal secured on the plate, a hollow shaft section held against sliding on said journal, a second hollow shaft section secured to the disk, said journal being adapted to receive the second shaft section and disk, means adapted to secure the shaft sections together on said journal, a spool, and gearing driven through the shaft sections for rotating the spool.

19. A reel comprising a cage having a circular aperture in one side thereof, a flanged spool rotatably mounted in the cage, a spool-driving disk set into said aperture, said disk being of greater diameter than the adjacent flange of the spool, and multiplying gearing between the driving disk and the spool.

20. A reel comprising a back plate and a driving disk, a spool journaled between the plate and the disk, means on the disk for driving the spool, and means carried upon the disk and acting directly upon the spool for retarding rotation of the spool.

21. A reel comprising a back plate, a spool journaled on said plate, gearing on the plate for driving the spool, a driving member, and clicking mechanism on the driving member for retarding rotation of the spool.

22. In a reel construction, a unit comprising a plate, a pin secured to the plate, a tubular shaft on the pin, a spool upon the shaft, a gear upon the shaft and a gear upon the spool, and intermediate gearing mounted on the plate and intermeshing with the two gears aforesaid.

23. A reel comprising a back plate and a disk, a gear mounted upon the back plate, a shaft section rotatably carried by the back plate, a gear on the shaft section meshing with the first named gear, a spool driven from the first named gear, a second shaft section secured to the disk, and means for connecting the shaft sections together.

24. In a reel construction, a unit comprising a plate, a pin secured to the plate, a hollow shaft rotatably mounted upon the pin, a spool rotatably mounted upon the shaft, means to rotate the shaft, and gearing between the shaft and the spool.

25. A fishing reel including a clicking mechanism comprising a substantially triangular pivoted pawl having one surface convex, a curved spring resting against the convex surface and having a notch therein, and means to rotate the pawl to an inoperative position in which one corner thereof is received in the notch.

26. A finishing reel including a clicking mechanism comprising a substantially triangular pivoted pawl, a spring bearing against one side of the pawl, a notch in the spring, and means to rotate the pawl to an inoperative position in which one corner thereof is received within the notch.

27. A fishing reel having a click ratchet and a pivoted pawl, substantially triangular in form, with one of the corners thereof adapted to engage the ratchet, the side of the pawl opposite to the ratchet being outwardly curved to afford a convex surface, and a curved spring fitting around the convex surface.

CHARLES T. PFLUEGER.